United States Patent [19]

Cutaia

[11] 3,737,855

[45] June 5, 1973

[54] CHARACTER VIDEO ENHANCEMENT SYSTEM

[75] Inventor: Alfred Cutaia, Rochester, Minn.

[73] Assignee: International Business Machines Corporation, Rochester, Minn.

[22] Filed: Sept. 30, 1971

[21] Appl. No.: 185,214

[52] U.S. Cl. ....................340/146.3 AG, 340/146.3 S

[51] Int. Cl. ................................................G06k 9/12

[58] Field of Search .............340/146.3 H, 146.3 AG, 340/146.3 MA

[56] References Cited

UNITED STATES PATENTS

| | | | |
|---|---|---|---|
| 3,624,606 | 11/1971 | Lefevre | 340/146.3 AG |
| 3,339,179 | 8/1967 | Shelton, Jr. et al. | 340/146.3 H |
| 3,588,818 | 6/1971 | Congleton et al. | 340/146.3 MA |

*Primary Examiner*—Maynard R. Wilbur
*Assistant Examiner*—Leo H. Boudreau
*Attorney*—J. Michael Anglin, Carl W. Laumann, Jr. and J. Jancin, Jr.

[57] ABSTRACT

Disclosed herein is a character video enhancement system which functions to minimize undesirable black fillins, noise and white voids in character patterns. The characters and noise patterns may be viewed as comprised of pluralities of elemental areas. Enhancement is accomplished by using a series of algorithms which enables a decision to be made at each elemental area as to whether a black mark in an elemental area should be converted to a white mark, or a white mark to a black mark or left black or white. The decision made at each elemental area is made independent of the raw video at that area and depends only on the markings in neighboring areas. For each elemental area, the surrounding neighborhood is investigated to determine:

a. the probability E that the surrounding elemental areas are not part of an a priori defined primitive feature set given that the elemental area under consideration is assumed to contain a white mark;

b. the probability I that the surrounding elemental areas are part of the a priori defined primitive feature set given that the elemental area under consideration is assumed to contain a black mark; and c. threshold levels $T_E$ and $T_I$ determined on the basis of contrast measurements.

The probabilities E AND I are compared with the threshold levels $T_E$ and $T_I$ to determine whether the content of the elemental area under consideration should be altered or left as is.

13 Claims, 14 Drawing Figures

| $S_{KJ}$ | $A_{KJ}$ | $B_{KJ}$ | RELATIONSHIP | PRINT QUALITY CHARACTERISTICS HYPHOTHESIS | IF $A<22$, THEN $T_E, T_I$ CURVE USED IS |
|---|---|---|---|---|---|
| 0 | 0 | 0 | $S = A = B$ | PRINTING CONTRAST IS UNIFORM OVER PATTERN, BUT LIGHT DENSITY-- PROBABLY NO NOISE | FIG. 9 |
| 0 | 0 | 0 | $S = A \neq B$ | PRINTING CONTRAST IS UNIFORM OVER PATTERN BUT NOT IN REGION ABOUT $X_{KJ}$ (DARKER CONTRAST NOISE) | FIG. 8 |
| 0 | 0 | 0 | $S \neq A = B$ | SHADOW OR SHADING | FIG. 9 |
| 1 | 0 | 0 | $S \neq A \neq B$ | UNIFORM PRINTING-- ENTERING OR LEAVING STRONG INTERSECTION OF STROKES OR A VERTICAL | FIG. 9 |
| 1 | 0 | 1 | $S \neq A \neq B$ | PRINT CONTRAST LOCALLY IS UNIFORM BUT DARKER THAN SHOULD BE-- NOISE, HEAVY PRINTING | FIG. 8 |
| 1 | 1 | 0 | $S = A \neq B$ | UNIFORM PRINTING-- EITHER LEAVING A PATTERN OR WITHIN LOCAL NOISE REGION | FIG. 8 |
| 1 | 1 | 1 | $S = A = B$ | UNIFORM PRINTING | FIG. 9 |

WHERE

1= 0.3 TO .43 CONTRAST RANGE (NORMALIZED)
0= 0 TO .3 CONTRAST RANGE (NORMALIZED)

FIG. 10

CHARACTER VIDEO ENHANCEMENT SYSTEM

BACKGROUND OF THE INVENTION

In character recognition systems reliability is a function of how close the features of raw characters conform to expected predefined features. Recognition is generally accomplished by comparing detected character features with the predefined features to generate signals representing the raw character. However, due to various influences, the features of the raw characters often do not correspond to the expected features. For example, characters read from a carbon copy document may have broad, ill defined feature strokes with character boundaries difficult to discriminate. Indeed it is not uncommon for boundaries of adjacent characters to merge. Similarly, light characters present feature recognition problems in that feature strokes may appear disjointed, boundaries may be difficult to detect and features may be lacking.

To increase the reliability of the character recognition system it is common practice to operate on raw characters prior to the feature comparison step to cause the raw character features to approach expected features. An example of such a character enhancement system is U.S. Pat. No. 3,196,398, Baskin, issued July 20, 1965. The Baskin system however is limited to generating a continuous thin line pattern from a wide-line pattern.

SUMMARY OF THE INVENTION

The present system is an improved character enhancement system adaptable for use in the software environment. Marking patterns, undergoing enhancement, are scanned by a scanning beam over a plurality of elemental areas. Responsive to the intensity of the reflected light from each elemental area, a black or white bit is generated and serially applied to a matrix type shift register.

A portion of the shift register is selected as a mask area with a location within the mask area designated a decision bit location $X_{KJ}$. As each bit enters the $X_{KJ}$ location a series of operations are performed to determine if the bit should be a white bit or a black bit. If a white bit determination is made, a black bit in the $X_{KJ}$ location is extracted. Similarly, if a black bit determination is made and a white bit appears in the $X_{KJ}$ location a black bit is inserted. Determining the proper state of the bit at the $X_{KJ}$ location is made independent of the actual state of the bit but solely by an investigation of states of the bits in the register stages about the $X_{KJ}$ location.

Defining an a priori set of primitive features and criteria for satisfying these features, the register stages surrounding the $X_{KJ}$ location are read out and a determination made of the probability I, that the bits in these surrounding stages are part of at least one of the primitive features assuming the bit in the $X_{KJ}$ location is a black bit. The probability measurement is made by comparing the states of the surrounding bits to the defined criteria. A measure is also made of the probability E that the surrounding bits are not part of any one of the primitive features assuming the bit at the $X_{KJ}$ location is white.

The above probability measures are with respect to the set of defined primitive features. However, the probability that the pattern vector, that is, the feature pattern surrounding the $X_{KJ}$ location as determined by the states of the bits in the surrounding area, is also a part of a character feature is a function of the relative contrast. For example, if the neighborhood about the $X_{KJ}$ location possesses dark contrast there is a greater probability that the pattern vector is part of a character feature than if the neighborhood possessed light contrast.

To relate the measured probabilities I and E to the contrast, threshold probability levels $T_I$ and $T_E$ are developed as functions of the contrast. A measured probability I is controlling thus ordering the insertion of a black bit when it is greater than the threshold level $T_I$ while the probability E is controlling when it is greater than $T_E$.

In the preferred embodiment, a data processing system such as the IBM 360/30 is coupled to a document scanning system and matrix type shift register. Scanning of the document, shifting of the bits in the register and decisions as to the insertion or extraction of a bit at the $X_{KJ}$ location are accomplished by suitably programming the system.

Another feature of the invention is the iterative property included with the enhancement operations. To help increase the rate of enhancement, a contrast measurement is made in the mask area and in a mask area displaced Δ rows from the original mask area. If predefined conditions are satisfied, the decisions relating to the $X_{KJ}$ location bit are made on the basis of previously processed bits rather than on the bits representing raw data.

BRIEF DESCRIPTION OF THE DRAWINGS

FIG. 10 is a table summarizing the contrast level rules for selecting $T_I$ and $T_E$.

DETAILED DESCRIPTION OF THE PREFERRED EMBODIMENTS

A. General System Concept

The enhancement technique disclosed herein operates to increase the reliability of conventional character recognition systems by operating on raw character patterns and noise to minimize the occurrence of black fill-in, noise markings, and white voids appearing in and around character patterns on a document to be read. As a result of the enhancement technique disclosed herein, character features are accentuated, feature boundaries are smoothed, and the character stroke width is standardized. Further, noise markings which can confuse the recognition system are eliminated.

Figure 1A:
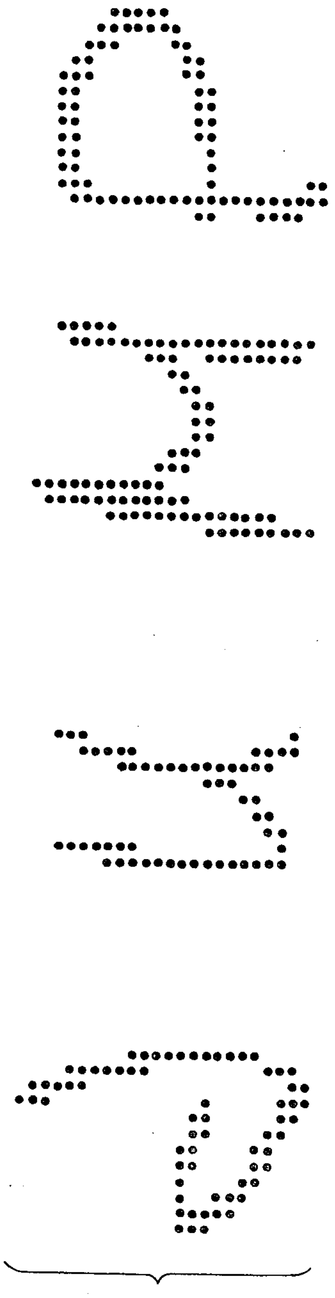
FIGS. 1*a* — 1*c* illustrate a set of raw characters and their enhanced form.

FIG. 1a illustrates raw characters depicting the word JUMP. Relatively light, poorly defined raw characters such as these may be the result of worn carbons or poor quality inking equipment.

Figure 2A:
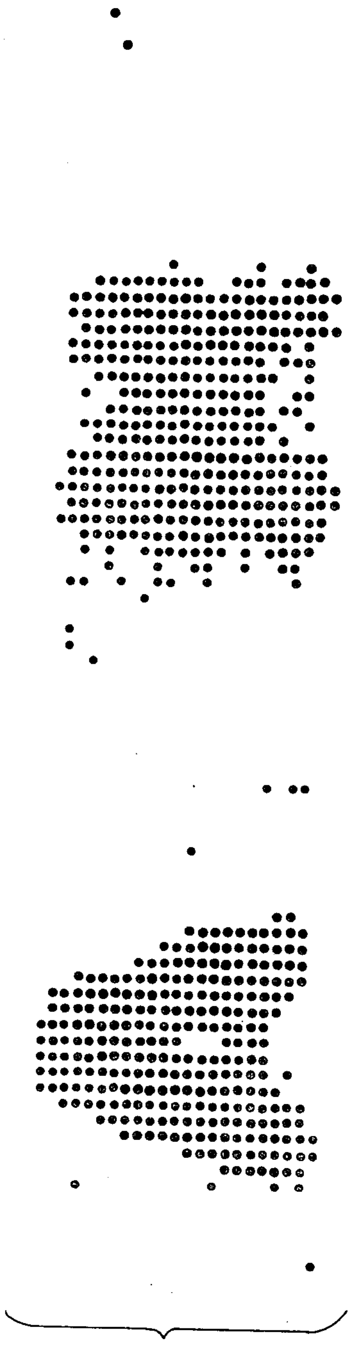
FIGS. 2*a* — 2*c* illustrate a second set of raw characters and their enhanced form.

FIG. 2a illustrates raw characters depicting the letters AM. The heavy lines, generally broad stroke characters may appear on carbon copy documents for example when new, heavily inked carbon paper is used as well as on documents produced by many copying machines. Character recognition systems often have difficulty recognizing thin line characters such as that illustrated in FIG. 1a and wide line characters such as that illustrated in FIG. 2a. To help standardize the character and accentuate the feature boundaries to thus increase the reliability of the character recognition system, the boundaries of each of the characters are investigated to determine when and where black markings are to be inserted or extracted to enhance the pattern.

It is noted that although the characters in FIGS. 1 and 2 appear as series of discrete markings the actual raw characters appearing on a document are generally formed of relatively continuous line segments. The representation of the raw characters as a series of discrete markings has been selected for ease in understanding the principles of the invention and, in addition, because the enhancement operation described hereinbelow operates on character patterns and noise which have been converted to the discrete form.

The discrete markings correspond to the division of the document to be read into elemental areas. Each of these areas is scanned to determine if it contains a predetermined minimum quantity of black markings as opposed to the absence of such markings in favor of white markings signifying the document background. Areas containing predetermined quantities of black markings are termed black areas as opposed to white areas. The terms black area and white area are used merely to define the contrast between a mark on the document and its background. As such, the term black area defines an area containing a portion of a dark character or noise on a light background or a light character or noise on a dark background.

The formation of a raw character into a series of discrete marks is conventional and accomplished by viewing the document as being comprised of a plurality of elemental areas. The document may be scanned with a scanning beam in a raster pattern, each scan passing over several elemental areas. As is known in the art, the document need not be physically divided into separate areas but rather each scan of the scanning beam may be divided into a number of elemental, discriminable increments. During each scan increment the intensity of the reflected beam is detected to determine if the beam has intersected a black area or a white area.

Figure 1B:
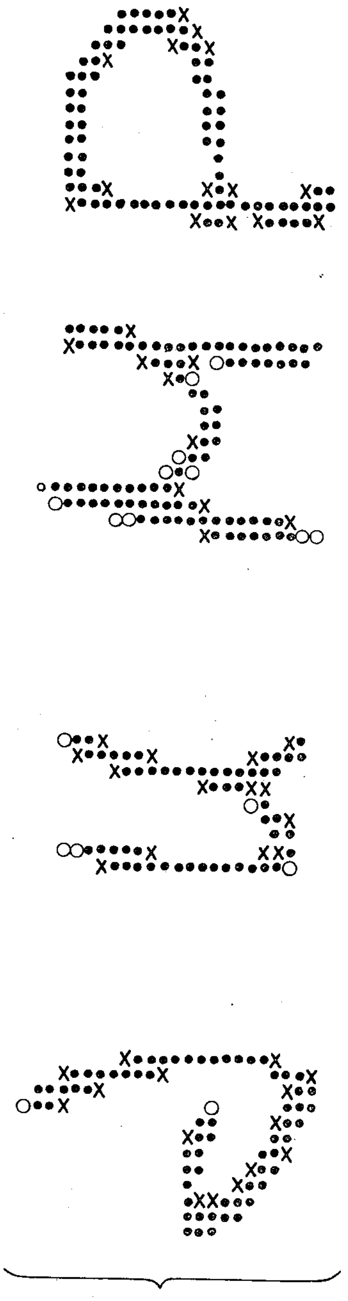
Figure 2B:
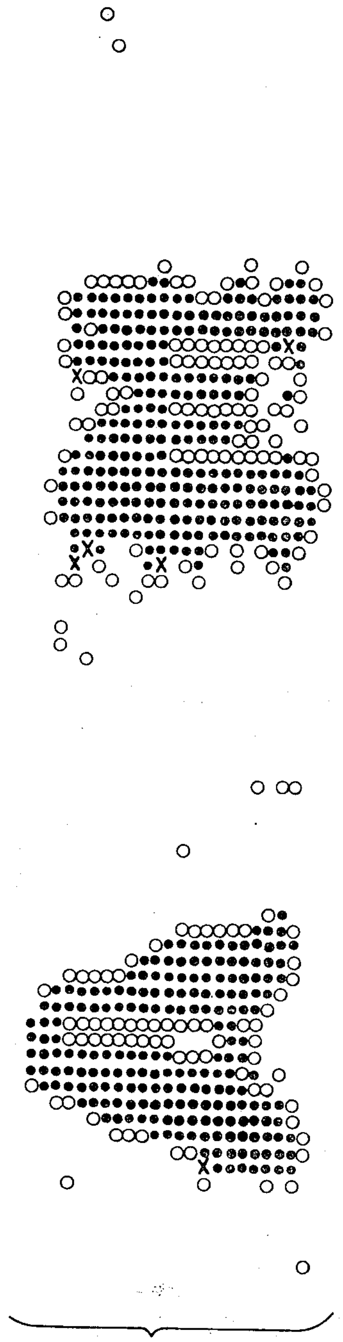

FIGS. 1b and 2b illustrate some of the decisions made by the system acting on the boundaries of marking patterns to selectively alter the states of elemental areas. The symbol X represents elemental areas wherein a white area is to be converted to a black area while the symbol O represents black areas to be converted to white areas.

Figure 1C:
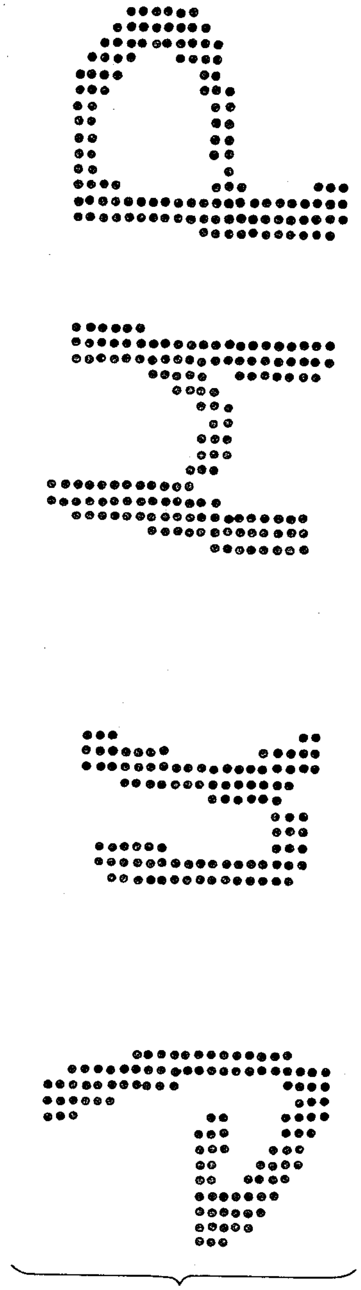
Figure 2C:
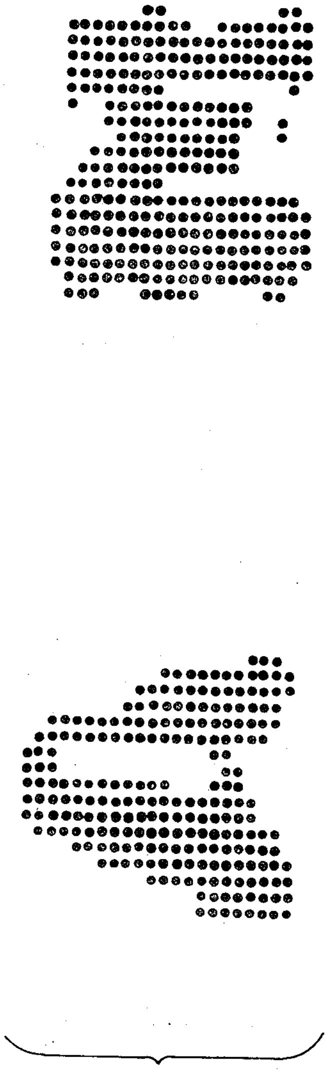

FIGS. 1c and 2c illustrate enhanced characters. It is noted that at this point, that the system is iterative, in that character enhancement may involve several passes of a character pattern through the system, with each additional pass operating on the character as previously enhanced by the prior pass through the system. In this manner, the boundaries of the character pattern continuously improve by causing them to converge or diverge to preselected standardized stroke widths. As can be seen from FIG. 1c the letters JUMP have diverged to approximately a three elemental area wide stroke width.

Figure 3:
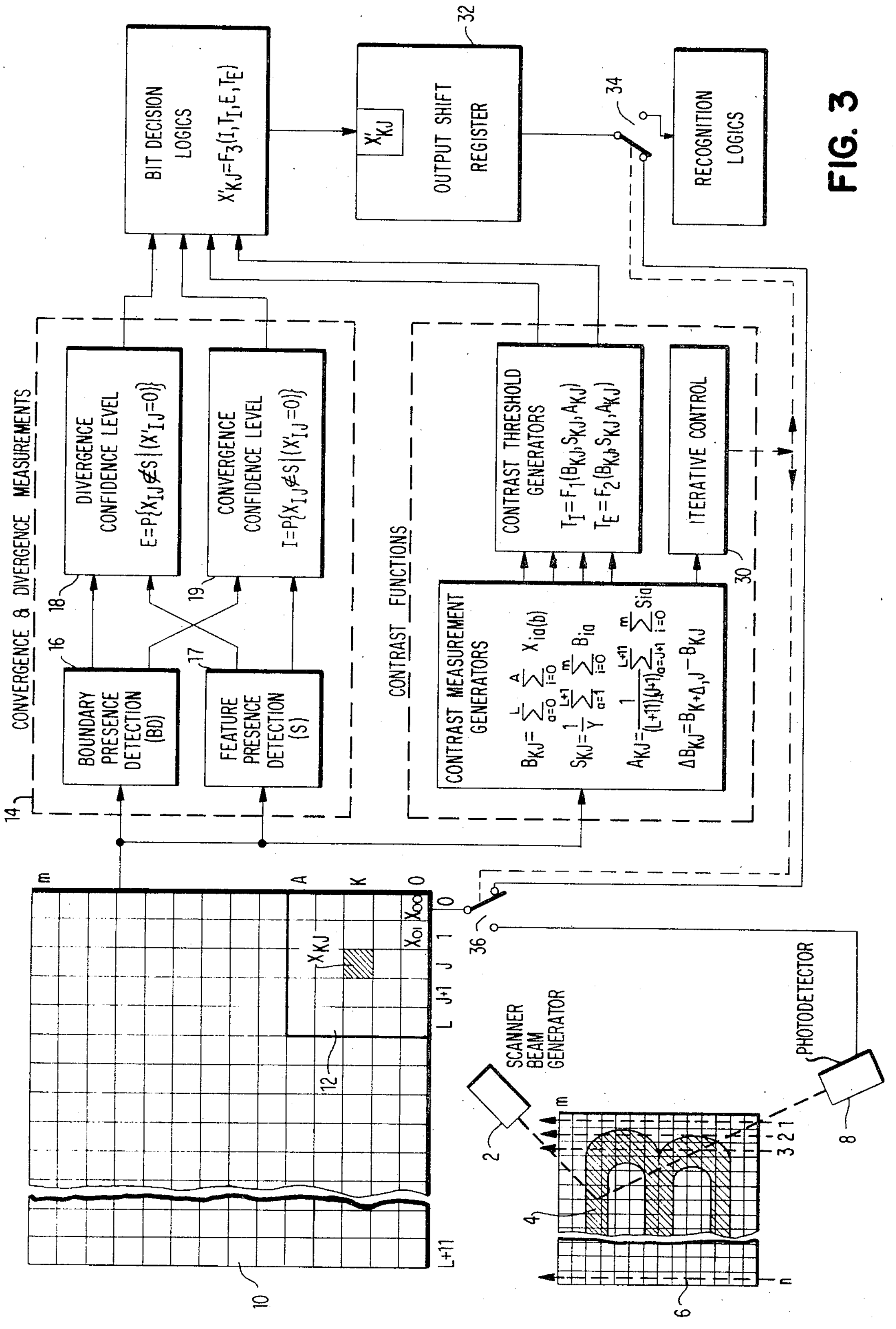
FIG. 3 is a general system diagram of the invention.

FIG. 3 illustrates the video enhancement system of the invention. Scanner 2 raster scans the character 4 situated on document 6. In the illustration, the scanner beam travels through a series of vertical scans 1, 2 . . . *n* each scan consisting of a number of detectable incremental steps defining the elemental areas. The intensity of the reflected beam from each of the elemental areas is detected by the photodetector 8 and converted into a black bit corresponding to a black area or a white bit corresponding to a white area. The photodetector output is applied to a matrix type serial shift register 10 possessing a minimum of L columns and *m* rows. The number of rows is determined by the number of increments in each scan and thus the number of elemental areas crossed by the beam. Each bit entering register 10 enters a location $X_{00}$ and travels upwards through column 0 to row *m*. The bit is then shifted to location $X_{01}$ and continues to travel through the stages of column 1. The bit continues to be shifted one stage at a time in the manner described for each new bit entering location $X_{00}$.

A portion of the matrix register 10 is selected as a mask area 12, with the $X_{KJ}$ stage within the mask area being defined as the decision bit location. The $X_{KJ}$ location is generally selected at the center portion of the masking area 12. Since each bit entering the register serially shifts therethrough, each bit will at one time pass through the $X_{KJ}$ decision bit location. When the bit at the $X_{KJ}$ location is on the boundary of a marking pattern, whether it be a character pattern or noise, operations are performed to decide if the bit should be changed from black to white, or from white to black, or left black or white. This decision is made independent of the content of the decision bit location. That is, the decision is made independent of whether or not the content of the $X_{KJ}$ location is a black bit or a white bit but depends only on the results of an investigation of the contents of the stages in the neighborhood about the $X_{KJ}$ location.

More specifically, when the content of the $X_{KJ}$ location is found to be a boundary bit, a boundary convergence measurement and a boundary divergence measurement are made. These measurements are made by investigating the contents of the register stages surrounding the $X_{KJ}$ location, to determine the probabilities that these surrounding areas are part of or not part of an a priori set of selected primitive feature patterns having an a priori selected feature stroke. Mathematically, these two probabilities are expressed as $$P\{X \notin S/X'_{KJ}=0\} = E \qquad (1)$$

$$P\{X \in S/X'_{KJ}=1\} = I \qquad (2)$$

Where:

$X$ = the marking pattern, i.e., the pattern vector, in the elemental areas surrounding the decision bit location $X_{KJ}$;

$S$ = the $n$ dimensional space containing the a priori defined primitive feature strokes; i.e., a series of different a priori defined primitive features having a priori defined stroke width.

$(X'_{KJ} = 0)$ = hypothesis that the decision for the bit at $X_{KJ}$ should be white;

$(X'_{KJ} = 1)$ = hypothesis that the decision for the bit at $X_{KJ}$ should be black.

Equation 1 states that $E$ is a measure of the probability that the pattern $X$ of black bits, surrounding the decision bit location, is not part of any one of the defined primitive features, assuming that the bit at the decision bit location is made a white bit.

Equation 2 states that $I$ is a measure of the probability that the pattern $X$ of black bits surrounding the $X_{KJ}$ location is part of one of the defined primitive features, assuming the bit at the $X_{KJ}$ location to be a black bit.

The fact that the measured value of I may be high does not provide sufficient information upon which to base a decision that the bit at the decision bit location should or should not be part of a character boundary. Equations 1 and 2 are simply expressions of the probability that the $X_{KJ}$ bit and its surrounding black bits are part of at least one of the defined primitive features as determined by a comparison of these bits to defined criteria for being part of the primitive features.

However, consideration must be given to the probability that the primitive feature is actually part of a character. An indication of this probability can be had by investigating the contrast in the neighborhood about the $X_{KJ}$ location. For example, let it be assumed that the probability I has been found to be high while the probability $E$ is found to be low, thus leading one to the conclusion that the bit at the $X_{KJ}$ position should probably be made a black bit. However, if the neighborhood about the $X_{KJ}$ location contains many black bits, indicating dark contrast, the probability that the bit at the $X_{KJ}$ location is also part of the character marking is greater that it would be if the contrast in the neighboring area was light. Thus, one has more confidence in the high I probability measure when it is associated with a bit situated in a dark contrast section of a document than if the bit was situated in a lighter contrast section.

Similarly, a high measure of the probability $E$ creates greater confidence that in the end analysis the bit at the $X_{KJ}$ should be a white bit when the surrounding contrast is light than would be the case if the surrounding contrast was dark. Thus, the probability measurements I and $E$ must be related to the surrounding contrast in order to make a meaningful determination as to whether or not the bit at the $X_{KJ}$ location should be black or white.

In accordance with the teachings of the invention, the relative contrast of the neighborhood about the $X_{KJ}$ position is expressed as threshold probability levels $T_I$ and $T_E$. The measured values of $I$ and $E$ are compared to $T_I$ and $T_E$ with the result of the comparison used to make the decision concerning the final state of the bit at the $X_{KJ}$ location. The specific contrast measurements made and the manner in which they relate to each other to determine $T_I$ and $T_E$ is described below. At this point it is sufficient to understand that two threshold levels representing the contrast in the neighborhood about the decision bit location are determined. Once the values of $I$, $E$, $T_I$ and $T_E$ have been determined for a bit at the $X_{KJ}$ location, the final decision as to the selected state of $X_{KJ}$ is made. With the final, selected state of the $X_{KJ}$ bit represented by $X'_{KJ}$, the decision rules are expressed mathematically as:

$$X'_{KJ} = 1$$
$$\text{if } |I - E| \geq T$$
$$\text{and } I \geq T_I,\ E < T_E$$
$$\text{where } T = |T_E - T_I| \qquad \text{(a.)}$$

This means that if the $X_{KJ}$ bit was originally a black bit, the existing boundary is retained. If the $X_{KJ}$ bit was originally a white bit, it is converted to a black bit to diverge or smooth the boundary.

$$X'_{KJ} = 0$$
$$\text{if } |I - E| \geq T$$
$$\text{and } E \geq T_E$$
$$I < T_I \qquad \text{(b)}$$

Thus, if the $X_{KJ}$ bit was originally a black bit it is converted to a white bit to converge the boundary. If the $X_{KJ}$ bit was originally a white bit the boundary is retained.

$$X'_{KJ} = X_{KJ}$$
$$\text{if } |I - E| < T \qquad \text{(c)}$$

This means that insufficient data is available to make a determination.

$$\text{if } I \geq T_I \text{ and } E \geq T_E,$$
$$\text{then } X'_{KJ} = 1$$
$$\text{if } I > E$$
$$\text{and } X'_{KJ} = 0$$
$$\text{if } E > I \qquad \text{(d)}$$

Figures 4, 5:
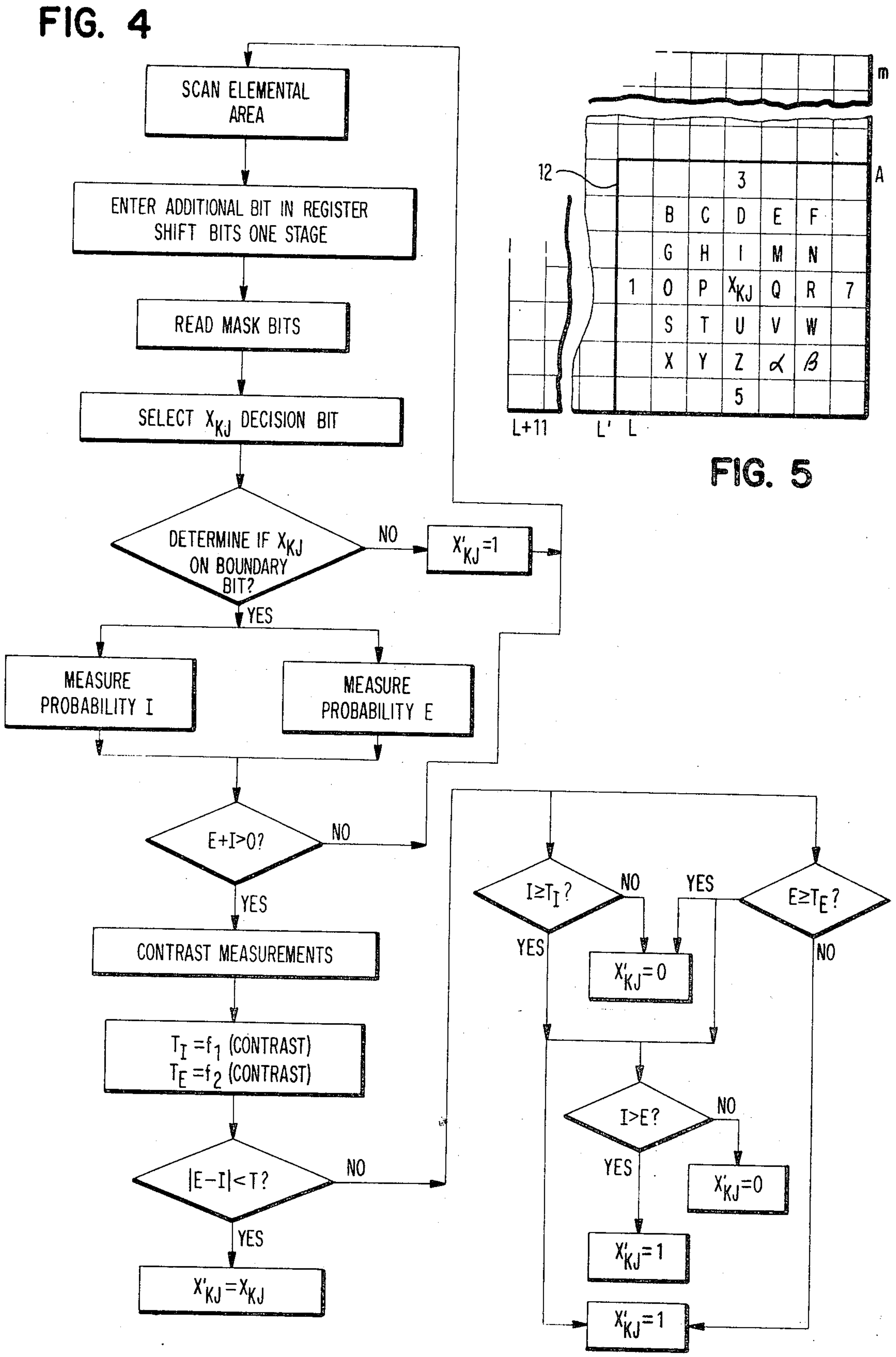
FIG. 4 is a flow chart detailing the technique of character enhancement as taught by the invention.
FIG. 5 is a labelled diagram of the mask portion of the shift register.

The above described technique for determining, on the basis of probabilities, the desired state of each elemental area is implemented using a properly programed general purpose digital computer in combination with a conventional document scanner and matrix type shift register. Programming of such a computer to operate in accordance with the teachings of this invention is well within the capabilities of programers possessing the ordinary skill of the art. From a programming standpoint the above described technique can be represented in flow form as illustrated in FIG. 4.

An elemental area is scanned under control of the processor and the content of this area is converted to a bit or white bit. The bit is entered into the register and the previously stored contents shifted. Subsequently the mask-area bits are read and the $X_{KJ}$ decision bit selected. If this bit is determined to be a boundary bit probability measures $I$ and $E$ are made. Assuming $E+I > 0$, the opposite condition being a trivial case, the contrast measurements are made to determine $T_I$ and $T_E$. If $|E-I|$ is found to be less than $T = |T_E - T_I|$ there is insufficient information to make a decision on the $X_{KJ}$ bit and therefore $X'_{KJ}$ is set to equal $X_{KJ}$. If the condition $I \geq T_I$ and $E \geq T_E$ are both satisfied the measured value of I is compared to E. If $I > E$ then the $I$ measure controls and $X'_{KJ} = 1$. A more detailed description of the above rules follows with a description of the technique for determining $I$, $E$, $T_I$ and $T_E$.

B. Boundary Extraction and Insertion Mask Concept Based On the Use of a Primitive Feature Set to Calculate the Probability Measurements I and E Referring to FIG. 3, the convergence and divergence measurements set forth generally at block 14 include for each new bit entering the $X_{KJ}$ location a determination of whether or not the bit is a boundary bit (block 16) and the determination whether or not the bit is a part of a predefined primitive feature (block 17). On the basis of these determinations a calculation of the divergence probability level E and the convergence probability level I is made.

The first operation as set forth at block 16 is to detect if the content of the $X_{KJ}$ location represents a boundary bit. A boundary bit will be defined herein as a bit satisfying a first order boundary requirement. It is possible however to define a boundary bit as one satisfying higher order boundary requirements. To understand the boundary requirements, reference is made to FIG. 5. This figure illustrates a mask area 12 within the register 10. When the bit in the $X_{KJ}$ location is adjacent to at least one white bit it is defined as a first order boundary bit. Thus, if any one of the locations H, P, T, U, V, Q, M or I stores a white bit, the bit at the $X_{KJ}$ location is a first order boundary bit. A second order boundary bit would exist at the $X_{KJ}$ location if at least one white bit exists at locations G, O, S, X, Y, Z, $\alpha$, $\beta$, W, R, N, F, E, D, C and B, assuming no white bit has been found at the first boundary level. Second or higher order boundary investigations are of interest when it is desired to accelerate the convergence and divergence of a pattern. However, for the purposes of explaining the operation of this enhancement system only first level boundaries will be considered.

With reference again to FIG. 5, the first order boundary requirement can be expressed by the Boolean expression $$BD_1 = \text{Boundary}_1 = (\overline{T}+\overline{U}+\overline{V}+\overline{Q}+\overline{M}+\overline{I}+\overline{H}+\overline{P})$$

This expression states that the $X_{KJ}$ bit is a first order boundary bit if any one or more of the $T$, $U$, $V$, $Q$, $M$, $I$, $H$ or $P$ locations in the mask area of the register is storing a white bit. Setting a logic 0 to represent a white bit, the step of boundary detection is accomplished by reading out the states of the above designated stages to determine the presence of a logic 0 in any one or more of these designated register stages.

The next operation is to determine if the bit at the $X_{KJ}$ location is part of a predefined primitive feature set. In the preferred embodiment, four primitive features are selected. It is understood, however, that the number and form of the primitive features are not limited to the four selected herein. The four selected primitive features are a horizontal line (H), a vertical line (V), a diagonal situated at a 45° positive slope (+D) and a diagonal situated at a 45° negative slope (−D).

The criteria for determining if a pattern vector is part of a primitive feature will now be described. Recognizing that the $X_{KJ}$ bit is further investigated only if it is on a boundary of a pattern within the mask area, each feature must be defined relative to its boundary sides. That is, the horizontal feature is defined relative to its top and bottom sides, the vertical feature with respect to its left and right sides, while the diagonal features are also defined relative to their top and bottom sides.

Figure 6:
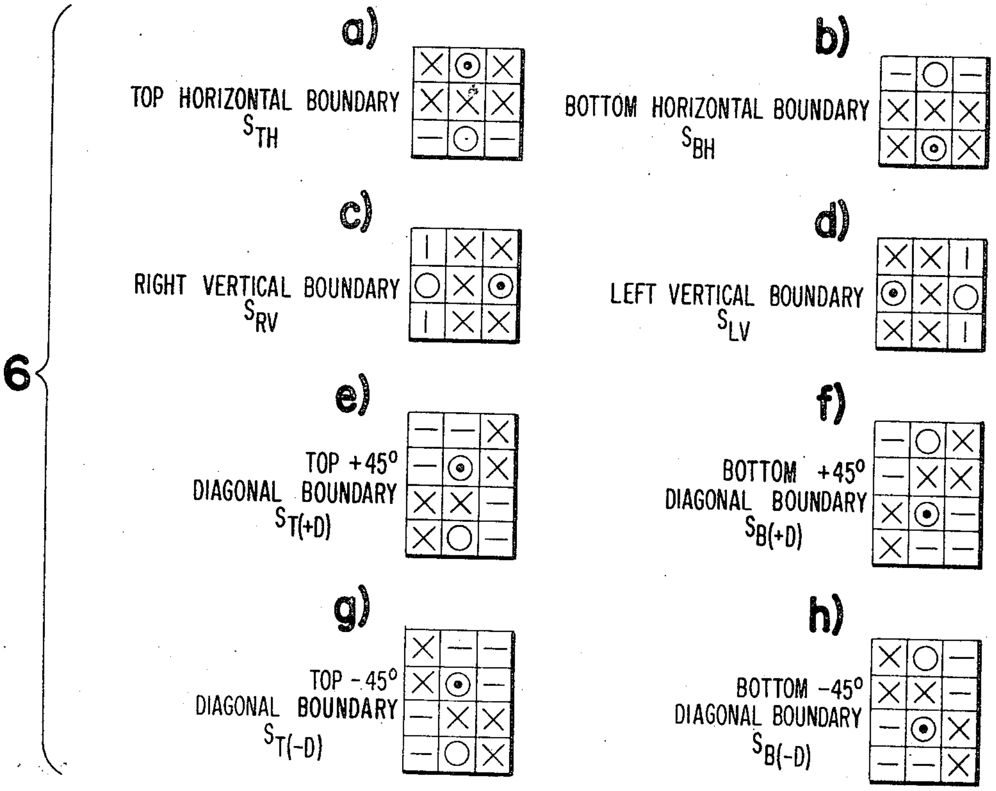
FIG. 6 illustrates a set of criteria for defining a set of a priori defined primitive features.

The criteria can best be understood with reference to FIG. 6 and the labelled bit positions of FIG. 5. In FIG. 6, the X marking indicates a black bit, a 0 marking a white bit with the "—" marking representing a "don't care" decision. The $X_{KJ}$ bit is designated by the symbol ⊙.

In terms of the labelled stages of FIG. 5 these primitive features having an a priori selected stroke width of two bits can be defined as:

$S_{TH} = (PTUVQ\overline{Z})$
$S_{BH} = (PQHIM\overline{D})$
$S_{RV} = (IUTPH\overline{O})$
$S_{LV} = (IUVQM\overline{R})$
$S_{T(+D)} = (MQUTY\overline{Z})$
$S_{B(+D)} = (TPIME\overline{D})$
$S_{T(-D)} = (HPUV\beta\overline{Z})$
$S_{B(-D)} = (CHIQV\overline{D})$ These features have been selected because within the mask area the character markings generally appear as one of these features.

The grouping of the primitive features into one category S can be expressed as $$S = S_H + S_V + S_{+D} + S_{-D}$$

where;

$S_H = S_{TH} + S_{BH}$, $S_V = S_{RV} + S_{LV}$, and so on.

Whenever $S$ is satisfied the $X_{KJ}$ bit is defined as a black bit which is part of the a priori primitive feature set S having an a priori selected stroke width. Thus, $X'_{KJ}$, the chosen value of the bit in the $X_{KJ}$ position is selected as follows.

$X'_{KJ} = 1$; if $(BD_1 \cdot S) + \overline{BD}_1 = 1$
$X'_{KJ} = 0$ if $(BD_1 \cdot \overline{S}) = 1$ Where:

$X'_{KJ} = 1$ specifies the selection of a black bit.
$X'_{KJ} = 0$ specifies the selection of a white bit.

In the preferred embodiment of the invention variable probability values I and E can be developed if BD is used as a measure of the number of surrounding stages containing white bits. That is, by counting the number of white bits and black bits in the boundary area, I and E can be measured as numbers between 0 and 1 depending upon the ratio of detected black bits to the number of black bits in the most closely met primitive feature.

The preferred algorithm for defining the variable level probability measures are:

$I = (BD_1)\, S_{max\ maj} + \overline{BD}_1$ (assuming a first order boundary)

Where:

$$S_{\max\ \mathrm{maj}} = \frac{\text{Number of bits matching the primitive feature } (f_i) \text{ having the greatest majority of satisfied bits}}{(\text{Total number of bits defining } f_i)}$$

and $$E = 1 - I$$

This algorithm can also be expressed as a function of probability E. Such an expression appears as:

$E = (BD_1)\, \overline{S}_{max\ maj}$ (assuming first order boundaries)

Where:

$$\bar{S}_{max\,maj} = \frac{\text{Number of mistmatched bits in the primitive feature } (f_i) \text{ having the greatest majority of bits satisfied}}{(\text{Total number of bits defining } f_i)}$$

Thus, the values of I and E range between zero and one. It is to be understood however that various other algorithms can be developed to produce a measure of the probabilities I and E. For example an explicit Boolean form of such an algorithm assuming first order boundaries is given by:

$I = BD_1\ S + \overline{BD}_1$

Where:

$I = 0$ or 1

$E = 1 - I$ $S = S_H + S_V + S_{1+D)} + S_{1-D)}$

The above description assumes a predefined mask area. The manner in which the size of the mask area is selected will now be described.

The size of the mask area is an important consideration for both boundary convergence and divergence measurements as well as the contrast measurements. The basic requirement of the mask area is that it be sufficiently large to view the two boundaries of the largest defined feature stroke width when one of the boundaries is positioned at $X_{KJ}$ location. The second consideration is that the mask area be as small as possible for cost reasons. The following relates the mask size to the stroke width of the largest defined pattern feature as viewed in the mask area.

Mask area $= L \times A$

Assuming $L = A$; then $(A - 1)/2 = SW$

Where $SW$ = the widest stroke width.

Therefore, $A = 2\ (SW) + 1$

Assuming $SW = 3$ then $L = A = 7$.

The maximum stroke width in the vertical direction may be made different from that in the horizontal direction. Under this condition $L \neq A$ and $L$ is defined in the same manner as $A$.

$$L - 1/2 = SW_V$$

Where $SW_V$ = the maximum vertical stroke width $$L = 2SW_V + 1$$

If $SW_V = 2$ then $L = 5$.

To summarize the boundary extraction and insertion technique based on a primitive feature set, each time a new bit appears at the $X_{KJ}$ position, a determination is made as to whether or not the bit is a boundary bit. If it is, a probability determination is made as to whether or not pattern vector about the $X_{KJ}$ location, that is the pattern of black bits about the $X_{KJ}$ location, is part of a predefined primitive feature.

As previously explained the calculated probability values E and I are measures of the confidence level that the pattern of black bits surrounding the $X_{KJ}$ bit location is part of a primitive feature. However, the probability that this pattern is also a part of a character feature depends on contrast measurements.

C. Boundary Contrast Measurement Function

This portion of the disclosure describes the boundary contrast measurements used to quantitatively determine, in real time, the average line stroke width of features, and the contrast relationship of the raw feature patterns to the background. Further, these measurements may be used as measurement criteria qualitatively separating quality parameters such as noise, shadow and shading variations within and between character patterns from good quality characters.

Figure 7:
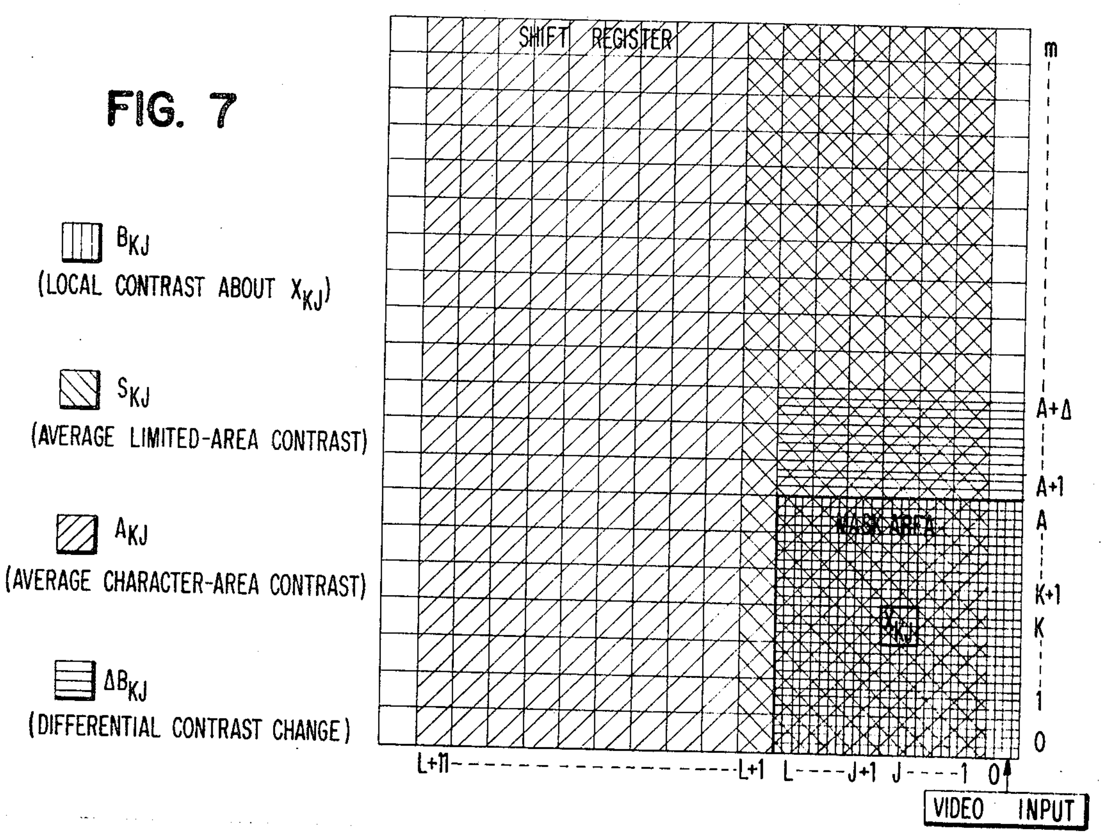
FIG. 7 is a view of the mask area showing the areas over which the contrast functions are taken.

FIG. 7 is an illustration of the shift register 10 showing the areas over which the contrast measurements are made. Four contrast measurements are made, each of which will be treated separately below. The first contrast measurement $B_{KJ}$ is a measure of the local contrast about the decision bit position $X_{KJ}$ and is determined by counting the number of black bits in the mask area. Measurement $S_{KJ}$ is the average limited area contrast in a scan range about the decision bit $X_{KJ}$. Specifically, it is the average sum of $B_{KJ}$ resulting from processing the adjacent past scan $J + 1$. Thus, for each of the m bits which have entered the $X_{KJ}$ position during scan $J + 1$, the local contrast $B_{KJ}$ is measured and stored with the average value of $B_{KJ}$ taken over these $m$ bits. $A_{KJ}$ is the average sum of $S_{KJ}$ resulting from processing a selected number of past scans. In the preferred embodiment, the average character area contrast is taken over scans $J + 1$ to $J + N$ which may includes an investigation of column 1 to $L + 11$. Finally, the fourth contrast measurement is $\Delta B_{KJ}$ which is a differential contrast change comparing $B_{KJ}$, the local contrast around $X_{KJ}$ to the local contrast about $X_{KJ}$ displaced by a vertical increment. The measurement is used to determine if an iterative mode should be used.

Mathematically, these measurements can be represented by the following equations:

$$B_{KJ} = \sum_{a=0}^{L} \sum_{i=0}^{A} X_{ia(b)}$$

$$S_{KJ} = \frac{\sum_{a=+1}^{L+1} \sum_{i=0}^{m} (B_{KJ_{ia}})}{Y}$$

$$A_{KJ} = \frac{\sum_{a=+1}^{L+11} \sum_{i=0}^{m} (S_{KJ_{ia}})}{(L+11) - (J+1)}$$

$$\Delta B_{KJ} = B_{K+\Delta,J} - B_{KJ} = \left( \sum_{a=0}^{L} \sum_{i=+\Delta}^{A+D^{\Delta}} X_{ia(b)} \right) - B_{KJ}$$

Where:

$B_{KJ}$ = the local contrast defined as the number of black bits within the mask area 12

$S_{KJ}$ = average sum of $B_{KJ}$ resulting from processing the adjacent past scan $(J+1)$ = limited area contrast $A_{KJ}$ = average sum of $S_{KJ}$ resulting from processing the last $(L+11)-(J+1)$ scans = character area contrast $Y$ = the number of bits in scan $J+1$ that resulted in $E + I > 0$ $X_{ia]b)}$ = a black bit within the mask area 12

$L$ = number of columns within the mask area $m$ = number of rows per column, which corresponds to the number of bits generated during each scan $A$ = number of rows in the mask area The four measurements relate the local contrast and its differential change at the boundary of the feature within the mask area to the contrast of the immediate limited area neighborhood and to the contrast of the immediate character area neighborhood. These measurements are used to determine the threshold levels $T_I$ and $T_E$.

The contrast criteria can also be viewed in normalized form. Thus, $B_{KJ}$(normalized)= *number of black bits in mask area/LA*.

It is assumed that the most frequently occurring features are the previously defined primitive features. Using this assumption, the normalized $B_{KJ}$ value for a line stroke having a thickness of $SW$ is defined as $B_{KJ}$(normalized) $= A\ (SW)/LA = SW/L$ Where:

$L = A$. Assuming $L = A = 7$ $B_{KJ}$(normalized) $SW = 2 = 2/7 = 0.30$ $B_{KJ}$(normalized) $SW = 3 = 3/7 = 0.43$ Thus, the desired local contrast $B_{KJ}$ (normalized) for a primitive feature viewed within a 7 by 7 mask area having a 2 to 3 bit wide stroke width ranges from 0.3 to 0.43. That is, the number of black bits in the pattern viewed within the mask area should be between 14 and 21. Since $S_{KJ}$ and $A_{KJ}$ are linearly related to $B_{KJ}$ these contrast measures are each representing the average line stroke width.

The relationship between the measured $B_{KJ}$, $A_{KJ}$ and $S_{KJ}$ and the threshold values will now be discussed. The relative relationship between the contrast measurements $B_{KJ}$, $A_{KJ}$ and $S_{KJ}$ are just as important as the absolute values of each measurement. The absolute magnitude of each of the measurements indicate the average stroke black/white contrast but their relationship help define noise, shadow, and shading characteristics within or between patterns. These contrast measurements are used to establish the threshold values $T_E$ and $T_I$. $T_E$ and $T_I$ are then used to define the minimum acceptable probability values E and I and their absolute minimum difference to enable a decision to be made on the bit at the $X_{KJ}$ location.

Figure 8:
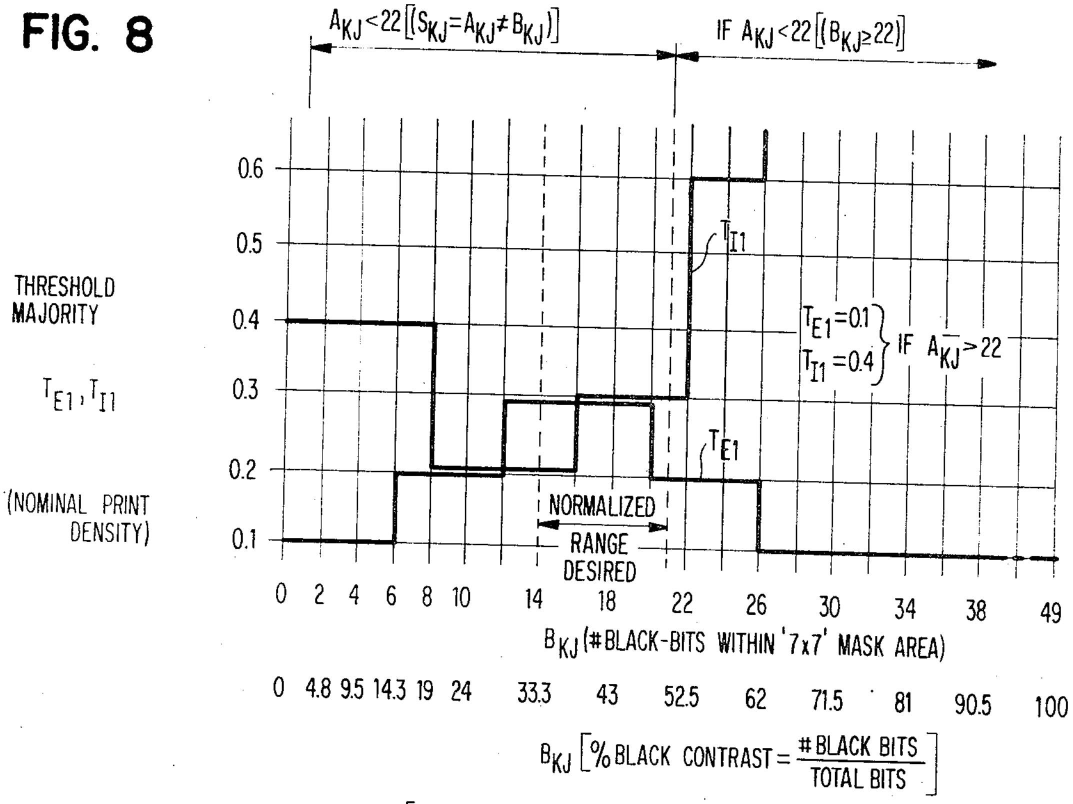
FIG. 8 is one set of curves for determining $T_I$ and $T_E$ as functions of contrast.
Figure 9:
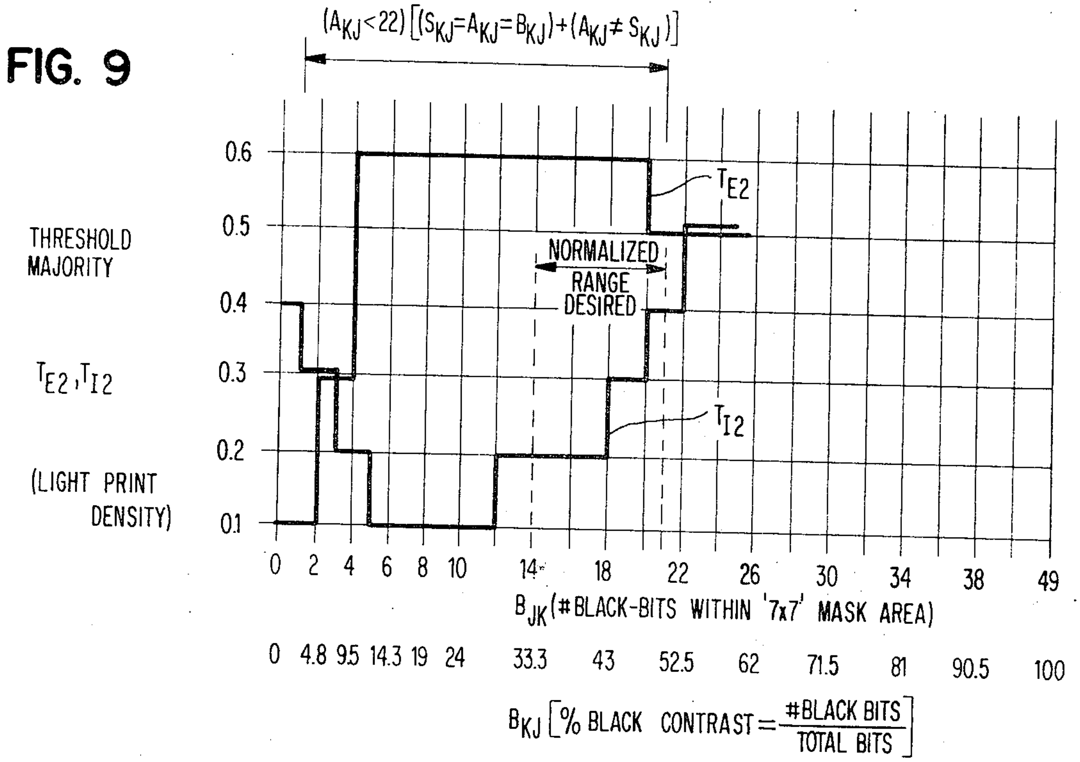
FIG. 9 is a second set of curves for determining $T_I$ and $T_E$ as functions of contrast.

The curves of FIGS. 8 and 9 relate the threshold levels $T_I$ and $T_E$ to the contrast measurements. These curves were developed using the trial and error method. Various types of characters, such as those produced by machine printouts, electric and manual typewriters, and handwritten characters were analyzed against desired quality levels in relation to the three contrast measurements. Various threshold levels were tried for each combination of values of $B_{KJ}$, $S_{KJ}$ and $A_{KJ}$ until the desired print quality was obtained. The result of these determinations for the 7 × 7 mask area is shown in as curves $T_{I1}$, $T_{I2}$, $T_{E1}$ and $T_{E2}$ in FIGS. 8 and 9. The values of $T_I$ and $T_E$ were developed for the preferred algorithm set forth above. These values may change for other algorithms but their relative relationship remains the same. Further, the absolute magnitudes of $A_{KJ}$ and $S_{KJ}$ can be normalized as was $B_{KJ}$ to develop a general relationship for the contrast relation rules set out hereinbelow.

The following contrast relationship rules have been experimentally developed using the contrast measurements $A_{KJ}$, $S_{KJ}$ and $B_{KJ}$ to develop a decision based upon the threshold functions $T_E$ and $T_I$. The rule can best be understood by assuming a specific case wherein the desired local contrast for the primitive feature viewed within the 7 by 7 masking area ranges from 14 to 21. In normalized form the desired contrast appears in the range from 0.3 to 0.43. Looking first to the measurement of $A_{KJ}$, the measured value is used to separate the character patterns into two contrast classes: those having greater than desired average line stroke thickness and those having equal or less than the desired line stroke thickness. Thus, if $A_{KJ} \geq$ 22 indicating an average line stroke thickness greater than that which is desired, $T_E$ and $T_I$ are said to be constant. That is, $T_I = K_I$ while $T_E = K_E$. In this specific example $T_E = 0.1$ $T_I = 0.4$. If $A_{KJ} \leq 21$ (or, more generally, $A_{KJ} \leq N_1$), the patterns are grouped into two more separate categories. Using the $B_{KJ}$ value, these groups are those which have a local contrast greater than the desired contrast $B_{KJ} \geq 22$ (or, again more generally $B_{KJ} \geq N_2$), and those which have a local contrast $B_{KJ} < 22$. For patterns having greater than the desired local contrast; that is, when $B_{KJ} \geq 22$ the curves of FIG. 8 are used. Since this indicates that the local area around the decision bit is dark the FIG. 8 curves are set to indicate the threshold $T_E$ to be much lower than the threshold $T_I$. This weights extraction heavier than insertion.

When it is determined that the local contrast $B_{KJ} <$ 22 which equals $N_2$ for this specific case, the relationship between $S_{KJ}$, $A_{KJ}$ and $B_{KJ}$ is investigated for determining the threshold selection. If the printing is uniform, that is, if $S_{KJ} = A_{KJ} = B_{KJ}$ or if the bit at the $X_{KJ}$ position is at the start or end of the pattern so that $S_{KJ} \neq A_{KJ}$ the curves of FIG. 9 are used to establish the threshold $T_E$ and $T_I$. For each pattern satisfying the condition, $A_{KJ} < 22$ and $B_{KJ} < 22$, and further, where $S_{KJ} \neq A_{KJ} \neq B_{KJ}$ signifying that the print is not uniform the curves of FIG. 8 are again used but in the range $B < 22$. The relationship between the three contrast measurements are summarized in the table of FIG. 10.

The manner in which the probabilities I and E are determined as well as the determination of the threshold levels $T_E$ and $T_I$ have been explained. The decision to make the bit at the $X_{KJ}$ location black or white is straight-forward once these values have been determined. The decisions are made according to the following rules.

$$X'_{KJ} = 1 \tag{a}$$

If $|I - E| \geq T = |T_E - T_I|$ and $I \geq T_I$, $E < T_E$. Thus given $X_{KJ}$ was originally black, the black bit is retained as a portion of the existing boundary. If $X_{KJ}$ was originally white, a black bit is added smoothing or diverging the existing boundary.

$$X'_{KJ} = 0 \tag{b}$$

If $|I - E| \geq T$ and $E \geq T_E$, $I < T_I$. Thus if $X_{KJ}$ contained a black bit, this black bit is extracted and the boundary is converged. If $X_{KJ}$ originally contained a white bit, no change is made and the boundary is retained.

$$X'_{KJ} = X_{KJ} \tag{c}$$

Indicates that no change is to be made because insufficient measurement data is available. This occurs if $|E - I| < T$.

As previously indicated, if both $I \geq T_I$ and $E \geq T_E$ are satisfied assuming $|I - E| \geq T$; $I$ is compared to $E$ and the larger of the two is controlling.

Use of the $\Delta B_{KJ}$ measurement will now be described. This measure is used to selectively trigger the iterative control 30 which can be viewed as a switch means for coupling the output shift register 32 to the decision logic rather than the input register 10. This is shown schematically in FIG. 3 by switches 34 and 36. In actuality the contents of the output register are not moved to the input register but rather selected contents of register 32 are read and fed to the decision logic rather than that of register 10.

Looking to FIG. 7, for each bit entering the $X_{KJ}$ position, both $B_{KJ}$ and $B_{K+\Delta\ ,J}$ are calculated. $B_{K+\Delta\ ,J}$ is calculated by conceptually moving the mask area to center on $X_{K+\Delta\ ,J}$ and counting the black bits therein.

If $\Delta\ B_{KJ}$ is positive (+) and $B_{KJ} \geq$ 36 the local contrast about $X_{KJ}$ is too dark to be a valid feature and the immediate future contrast is getting darker. It is therefore desirable to use enhanced video, that is, the enhanced elemental areas as stored in the output register to bootstrap the system through the dark hidden feature regions. Thus, the decisions are made on the basis of the contents of the column $J+1$, $J+2$ and $J+3$ in the output register 32 rather than on the contents of these column in the input register 10.

While the invention has been particularly shown and described with reference to a preferred embodiment thereof, it will be understood by those skilled in the art that various changes in form and details may be made therein without departing from the spirit and scope of the invention.

What is claimed is:

1. In a character recognition system, a process for modifying raw character video obtained from a document to cause the character features to approach a predefined primitive feature set, the process comprising the steps of:

a. scanning the document over a plurality of elemental areas thereof, and detecting the presence or absence of a marking in each scanned elemental area, b. generating for each scanned elemental area a black or white bit corresponding respectively to the presence or absence of a predetermined quantity of marking in the area, c. determining, in response to the black and white bits generated by the elemental areas surrounding an elemental area under consideration, a probability I that the surrounding areas are part of the primitive feature set assuming that the bit corresponding to the area under consideration is a black bit, d. determining, in response to the black and white bits generated by the elemental areas surrounding the element area under consideration, a probability E that the surrounding areas are not part of the primitive feature set assuming that the bit corresponding to the area under consideration is a white bit, e. generating contrast measurements indicative of the relative numbers of black and white bits generated by selected groups of the plurality of elemental areas, f. determining from the contrast measurements threshold levels $T_E$ and $T_I$ and g. comparing the probabilities I and E with the threshold levels $T_E$ and $T_I$ to selectively complement the bit generated by the area under consideration.

2. The process of claim 1 further including, a. storing generated bits in a matrix type serial shift register, each new bit entering the register causing previously stored bits to shift through succeeding register stages, b. designating a mask area within said shift register, c. designating a decision bit location $X_{KJ}$ within said mask area, each bit entering said register passing through said $X_{KJ}$ location as a result of additional bits entering the register, d. determining the probabilities I and E from a determination of the states of the shift register stages surrounding the $X_{KJ}$ location.

3. The process of claim 2 wherein said step of determining the probabilities I and E further include;

a. detecting if the generated bit at the $X_{KJ}$ location represents an elemental area situated at the boundary of a pattern feature of which the bit at the $X_{KJ}$ location is a part.

b. defining a criteria set for determinating if the bit at the $X_{KJ}$ location is part of a primitive feature within the primitive feature set, assuming the bit at the $X_{KJ}$ location is a black bit, and c. for each bit determined to be a boundary bit calculating on the basis of the defined criteria set, the probabilities I and E.

4. The process of claim 3 wherein said probabilities are proportional to $I = (BD_1)\ S_{max\ maj} + \overline{BD}_1$, where $BD_1$ indicates that the $X_{KJ}$ location represents an elemental area situated at a boundary of a pattern feature, and $S_{max\ maj}$ indicates the maximum extent to which a predetermined group of said elemental areas matches any predetermined feature within said primitive feature set, and $E = 1-I$.

5. The process of claim 4 wherein said step of defining a mask area comprises, selecting a maximum desired stroke width, and setting the mask area to be large enough to completely contain the two boundaries of a feature with a maximum stroke width with one boundary being position at the $X_{KJ}$ position.

6. The process of claim 5 wherein said step of defining a primitive feature comprises defining four primitive features consisting of a horizontal line, a vertical line, and a first and second diagonal line positioned respectively at a positive 45° slope and a negative 45° slope, each of said primitive features having said maximum desired stroke width.

7. The process of claim 6 wherein said step of boundary determination comprises investigating the first level register stages surrounding the $X_{KJ}$ location to determine the presence of a white bit.

8. The process of claim 2 wherein the step of calculating the threshold levels $T_E$ and $T_I$ comprise the steps of;

a. calculating the local contrast $B_{KJ}$ about the location $X_{KJ}$, b. calculating the average limited area sum $S_{KJ}$ over the adjacent preceeding scan, c. calculating the average character area contrast $A_{KJ}$ over N preceeding scans and d. combining said calculated values to determine $T_E$ and $T_I$.

9. The process of claim 8 wherein said step of combining includes;

a. determining the maximum permissible value of $B_{KJ}$ on the basis of an a priori selected stroke width, b. determining if the character area contrast $A_{KJ}$ is greater than the maximum permissible $B_{KJ}$, c. selecting a low constant value for $T_E$ and a high constant value for $T_I$ if $A_{KJ}$ is greater than the maximum permissible value for $B_{KJ}$,

10. A character enhancement system comprising:

a. means for scanning a document in a series of elemental scans, each elemental scan viewing an elemental area of said document, b. means for detecting the presence or absence of a marking in each scanned elemental area, said detecting means producing electrical signals representing black and white bits corresponding respectively to the presence and absence of a marking in each elemental area, c. register means for storing said black and white bits, and d. means for selectively generating the complement of each stored bit, said means including means adapted to calculate for each bit entered into said register a probability I that the elemental areas surrounding the elemental area represented by said each bit is part of a defined primitive feature set, assuming said each bit is a black bit, calculate for each bit entered into said register a probability E that the elemental areas surrounding the elemental area represented by said each bit is not part of the primitive feature set, assuming said each bit is a white bit, calculate contrast indicia representing the contrast about said each bit, determine, on the basis of the calculated contrast indicia contrast threshold levels $T_E$ and $T_I$ and compare the probabilities I and E with the threshold levels $T_E$ and $T_I$.

11. The character enhancement system of claim 10 wherein said register means is a shift register including a mask area and a decision bit location $X_{KJ}$ within said mask area, said means for selectively generating operating on each bit as it is stored in said $X_{KJ}$ location.

12. The character enhancement system of claim 11 further including output register means for storing bits corresponding to the bits in said matrix type shift register means and having values determined by said means for selectively generating.

13. The character enhancement system of claim 11 wherein said means for selectively generating includes means for solving the algorithm $I = (BD_1)S_{max\ maj} + \overline{BD}_1$ and $E = 1 - I$ wherein $BD_1$ defines the first order boundary about the decision bit location $X_{KJ}$ and $S_{max\ maj}$ = number of bits matching the primitive feature, of the primitive feature, set having the greatest majority of satisfied bits divided by the total number of bits which define the primitive feature.

* * * * *